(12) United States Patent
Ranganathan et al.

(10) Patent No.: US 7,792,838 B2
(45) Date of Patent: Sep. 7, 2010

(54) INFORMATION-THEORY BASED MEASURE OF SIMILARITY BETWEEN INSTANCES IN ONTOLOGY

(75) Inventors: Anand Ranganathan, White Plains, NY (US); Royi Ronen, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 11/693,367

(22) Filed: Mar. 29, 2007

(65) Prior Publication Data

US 2008/0243809 A1 Oct. 2, 2008

(51) Int. Cl.
*G06F 7/00* (2006.01)
(52) U.S. Cl. .................................. 707/739; 707/777
(58) Field of Classification Search .................. None
See application file for complete search history.

(56) References Cited

U.S. PATENT DOCUMENTS

| | | | | | |
|---|---|---|---|---|---|
| 5,418,943 | A | * | 5/1995 | Borgida et al. | 707/4 |
| 6,665,681 | B1 | * | 12/2003 | Vogel | 707/101 |
| 6,738,759 | B1 | * | 5/2004 | Wheeler et al. | 707/3 |
| 7,136,852 | B1 | * | 11/2006 | Sterling et al. | 707/5 |
| 2003/0163597 | A1 | * | 8/2003 | Hellman et al. | 709/316 |
| 2003/0233226 | A1 | * | 12/2003 | Kim et al. | 704/4 |
| 2004/0254950 | A1 | * | 12/2004 | Musgrove et al. | 707/102 |
| 2005/0192956 | A1 | * | 9/2005 | Evans | 707/5 |
| 2006/0053099 | A1 | * | 3/2006 | Gardner et al. | 707/3 |
| 2006/0059144 | A1 | * | 3/2006 | Canright et al. | 707/5 |

(Continued)

OTHER PUBLICATIONS

K. Anyanwu et al., "SemRank: Ranking Complex Relationship Search Results on the Semantic Web," World Wide Web Conference Committe, May 2005, pp. 117-127, Japan.

(Continued)

*Primary Examiner*—John R. Cottingham
*Assistant Examiner*—Nicholas E Allen
(74) *Attorney, Agent, or Firm*—Kenneth R. Corsello; Ryan, Mason & Lewis, LLP

(57) ABSTRACT

Improved information processing techniques for measuring similarity between instances in an ontology are disclosed. For example, a method of measuring similarity between instances in an ontology for use in an information retrieval system includes the following steps. A set of instances from the ontology is obtained. At least one of the following similarity metrics for the set of instances is computed: (i) a first metric that measures similarity between instances in the set of instances with respect to ontology concepts to which the instances belong; (ii) a second metric which measures similarity between instances in the set of instances where the instances are subjects in statements involving a given ontology property; and (iii) a third metric which measures similarity between instances in the set of instances where the instances are objects in statements involving a given ontology property. At least one taxonomy induced by the at least one computed similarity metric is stored, wherein the at least one induced taxonomy is usable for responding to requests submitted to an information retrieval system. When two or more of the first metric, the second metric and the third metric are computed, and two or more induced taxonomies corresponding to the two or more computed similarity metrics are stored, the method may include merging the two or more induced taxonomies to form a combined taxonomy, wherein the combined taxonomy is usable for responding to requests submitted to an information retrieval system.

25 Claims, 8 Drawing Sheets

U.S. PATENT DOCUMENTS

2008/0195587 A1* 8/2008 Hussami ............ 707/3

OTHER PUBLICATIONS

L. Ding et al., "Swoogle: A Semantic Web Search and Metadata Engine," CIKM, Nov. 2004, 8 pages.

J. Hau et al., "A Semantic Similarity Measure for Semantic Web Services," World Wide Web Conference, May 2005, 9 pages, Japan.

J.W. Kim et al., "CP/CV: Concept Similarity Mining Without Frequency Information from Domain Describing Taxonomies," CIKM, Nov. 2006, 10 pages, Virginia.

D. Lin, "An Information-Theoretic Definition of Similarity," Procs. 15th International Conference on Machine Learning, 1998, pp. 296-304, California.

A.G. Maguitman et al., "Algorithmic Detection of Semantic Similarity," World Wide Web Conference, May 2005, pp. 107-116, Japan.

P. Resnik, "Semantic Similarity in a Taxonomy: An Information-Based Measure and its Application to Problems of Ambiguity in Natural Language," Journal of Artificial Intelligence Research, 1999, vol. 11, pp. 95-130.

P. Schwarz, "Finding Similar Objects Using a Taxonomy: A Pragmatic Approach," ODBASE LNCS, 2006, pp. 1039-1057.

W3C, "OWL Web Ontology Language Overview," www.w3.org/TR/owl-features, Feb. 2004, pp. 1-19.

C-N. Ziegler et al., "Automatic Computation of Semantic Proximity Using Taxonomic Knowledge," CIKM, Nov. 2006, 10 pages, Virginia.

* cited by examiner

INFORMATION-THEORY BASED MEASURE OF SIMILARITY BETWEEN INSTANCES IN ONTOLOGY

FIELD OF THE INVENTION

The present invention relates to information processing techniques and, more particularly, to techniques for measuring similarity between instances in an ontology.

BACKGROUND OF THE INVENTION

It is known that the "Semantic Web" is an evolving extension of the World Wide Web in which web content can be expressed not only in natural (human) language, but also in a form that can be understood, interpreted and used by machines (e.g., computing devices) that are executing software programs (e.g., applications), thus permitting the applications to find, share and integrate information more easily. Accordingly, the growth of the Semantic Web has seen increasing amounts of knowledge in different domains being expressed using ontology languages such as the OWL Web Ontology Language (or simply "OWL").

As is known, OWL is intended to be used when the information contained in documents needs to be processed by applications (i.e., needs to be machine-interpretable), as opposed to situations where the content only needs to be presented to humans (i.e., human-interpretable). OWL can be used to explicitly represent the meaning of terms in vocabularies and the relationships between those terms. This representation of terms and their interrelationships is referred to as an "ontology."

Ontologies in OWL define the "concepts" (or classes), "properties" and "individuals" (or instances) relevant to some area of interest. The concepts are usually organized in a taxonomy based on a subclass relationship. Properties are associated with a domain and a range. Individuals belong to one or more concepts, and may be related to other individuals or literals through properties.

A key challenge in a number of search and information retrieval systems is finding the similarity between concepts in a taxonomy. The problem of finding the similarity between terms in a taxonomy has been widely studied. Some of these approaches use the structure of the taxonomy to derive a measure of similarity. Others make use of information-theory based approaches.

However, none of the existing approaches address the specific problem of combining taxonomic and relationship knowledge of instances (i.e., individuals) to measure their similarity.

Accordingly, improved information processing techniques are needed for measuring similarity between instances in an ontology.

SUMMARY OF THE INVENTION

Principles of the present invention provide improved information processing techniques for measuring similarity between instances in an ontology.

For example, a method of measuring similarity between instances in an ontology for use in an information retrieval system includes the following steps. A set of instances from the ontology is obtained. At least one of the following similarity metrics for the set of instances is computed: (i) a first metric that measures similarity between instances in the set of instances with respect to ontology concepts to which the instances belong; (ii) a second metric which measures similarity between instances in the set of instances where the instances are subjects in statements involving a given ontology property; and (iii) a third metric which measures similarity between instances in the set of instances where the instances are objects in statements involving a given ontology property. At least one taxonomy induced by the at least one computed similarity metric is stored, wherein the at least one induced taxonomy is usable for responding to requests submitted to an information retrieval system.

When two or more of the first metric, the second metric and the third metric are computed, and two or more induced taxonomies corresponding to the two or more computed similarity metrics are stored, the method may include merging the two or more induced taxonomies to form a combined taxonomy, wherein the combined taxonomy is usable for responding to requests submitted to an information retrieval system.

The first metric, the second metric and the third metric may include information theory-based measurements. The first metric may measure similarity of instances i and j in the set of instances based on the similarity of $C(i)$ and $C(j)$, where $C(i)$ and $C(j)$ represent sets of concepts to which the instances belong. The second metric may measure similarity of instances i and j in the set of instances based on the similarity of sets of objects in statements where the instances are subjects in the statements. The third metric may measure similarity of instances i and j in the set of instances based on the similarity of sets of subjects in statements where the instances are objects in the statements.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
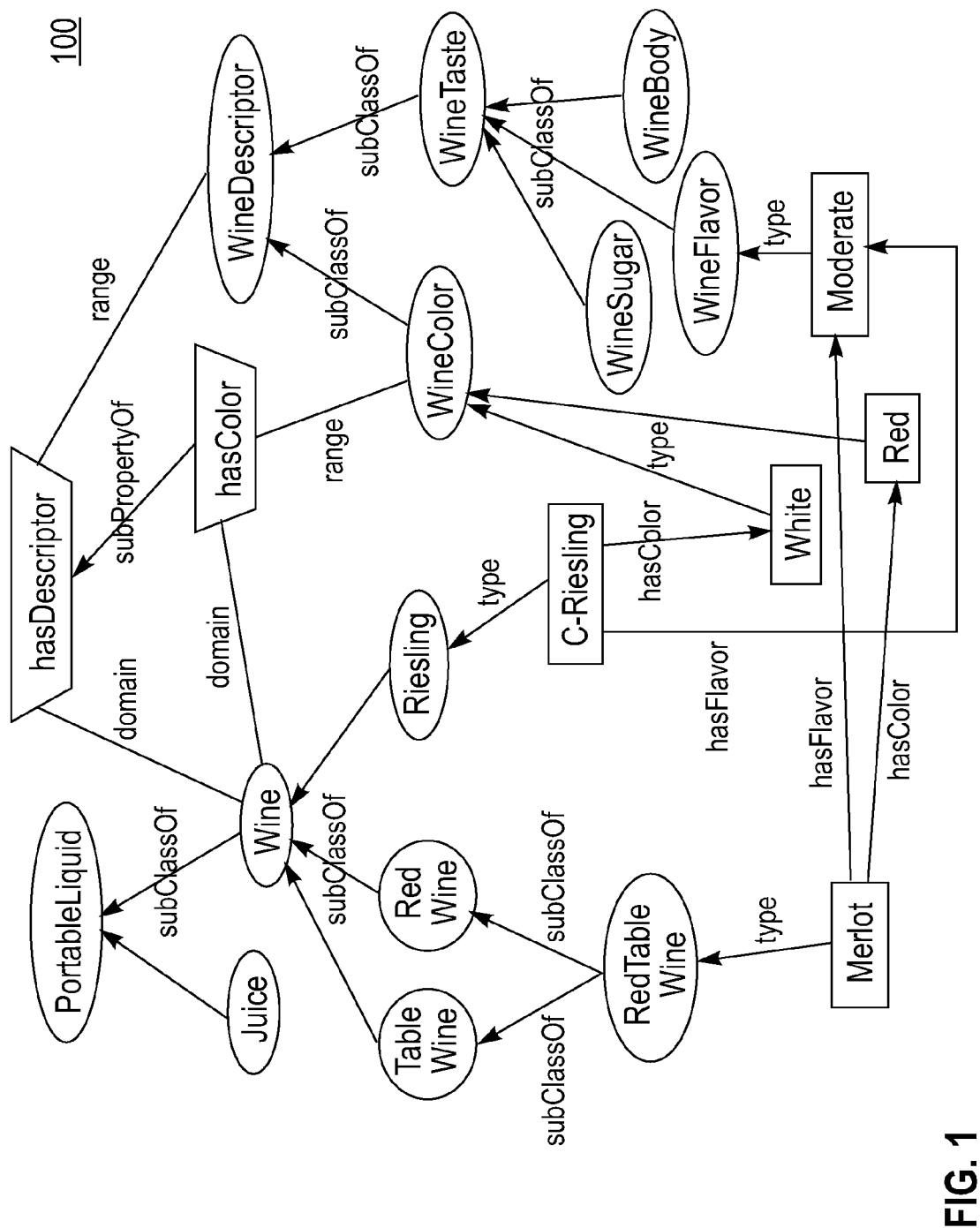
FIG. 1 illustrates a portion of an exemplary ontology taxonomy for use in describing an embodiment of the invention.

It is to be understood that while principles of the invention will be described below in the context of the OWL ontology language, principles of the invention are not so limited. Rather, principles of the invention are more generally applicable to any ontology based environment in which it would be desirable to provide a measure of similarity between instances in the ontology. In accordance with an OWL-based embodiment, the remainder of the detailed description refers to "instance(s)" as "individual(s)."

Before describing principles of the present invention, some information theory-based similarity principles will be described.

In information theory, the information content in an event e is $I(e)=-\log(p(e))$, where $p(e)$ is the probability for e to occur. Lin (D. Lin, "An information-theoretic definition of similarity," In *Proc. 15th International Conf on Machine Learning*, pp. 296-304, Morgan Kaufmann, San Francisco, Calif., 1998) defined semantic similarity between two objects based on information theory. According to Lin's definition, what we know about two objects is their "description." The description is composed of two things: "commonality" and "difference." Similarity is measured based on the following three intuitions:

(1) The more information content there is in the commonality between two objects, the more similar they are. If there is no commonality, similarity is zero.

(2) The more information content there is in the difference between two objects, the less similar they are.

(3) Maximum similarity is between an object to itself only. sim(a, b), the similarity between a and b, is defined to be:

$$sim(a, b) = \frac{I(\text{commonality}(a, b))}{(I(\text{description}(a)) + I(\text{description}(b)))}$$

This similarity measure is a number between zero (0) and one (1). One (1) is the similarity measure between an object and itself, a case where the information content in the description is equal to the information content in the commonality. Zero (0) is the similarity measure between two objects whose commonality does not have any information content. The measure is commutative.

Resnik (P. Resnik, "Semantic similarity in a taxonomy: An information-based measure and its application to problems of ambiguity in natural language," *Journal of Artificial Intelligence Research*, Vol. 11, pp. 95-130, 1999) proposed that $p(A)$, the "probability" associated with A, a concept in a hierarchical taxonomy, is the probability that a random individual belongs to A (in other words, the number of individuals in A divided by the total number of individuals populating the taxonomy). Hence, the information contents of the description of a class A is $-\log(p(A))$. Lin used this definition to say that given two classes, A and B, the information content of the description of the two classes is the sum of their information contents, i.e., $(-\log(p(a)))+(-\log(p(b)))$.

The information content of the commonality of A and B can be defined in terms of the information content of their least common ancestor, represented as $lca(A, B)$. The information content of the commonality of classes A and B is $-\log([p(lca(a, b))]^2)=-2\log(p(lca(a, b)))$. This is the probability for individuals i and j to satisfy $i \in lca(a, b) \wedge j \in lca(a, b)$. Therefore:

$$sim(A, B) = \frac{-2\log(p(lca(A, B)))}{(-\log(p(A))) + (-\log(p(B)))}$$

We now explain why the least common ancestor represents the commonality of A and B. The key intuition is that if an individual i belongs to a class A, it also belongs to A's ancestors (represented as $A_1, A_2, \ldots, A_m$). The description of a class can be defined as a set of class membership statements, i.e., $Desc(A)=\{i \in A, i \in A_1, i \in A_2, \ldots i \in A_m\}$. Similarly, $Desc(B)=\{i \in B, i \in B_1, i \in B_2, \ldots, i \in B_n\}$.

The set of statements describing commonality of A and B is $Comm(A, B)=\{(i \in q): ((i \in q) \in Desc(A)) \wedge ((i \in q) \in Desc(B))\}$. The information content of this set is based on the probability for two random individuals to satisfy the statements in it. If the taxonomy is a tree, then this commonality set contains statements describing membership in the least common ancestor of A and B, along with all its superclasses. Hence, the least common ancestor represents the commonality of A and B.

Principles of the invention realize that ontologies may provide more information about individuals than just the concepts to which they belong. Individuals in the Semantic Web may also be related to other individuals based on various properties. Accordingly, principles of the invention provide an approach for measuring the similarity of individuals in the Semantic Web by combining the knowledge about the taxonomy of concepts the individuals belong to, and the knowledge about the relationships between different individuals.

A core idea behind the inventive approach is to consider similarity between two individuals based on different, independent aspects. Each aspect is essentially one dimension for comparing the individuals. The fast aspect involves measuring the similarity between two individuals in terms of the similarity of the concepts they belong to. In addition, for each property defined in the ontology, there are two separate aspects that measure the similarity between the two individuals in terms of the similarity of the individuals they are related to, based on this property. One aspect considers relationships where the two individuals are the subjects in statements involving that property, while the other aspect considers relationships where the two individuals are the objects.

An algorithm according to an embodiment of the invention uses an information-theoretic approach to find similarity between two individuals for any aspect. For each aspect, it finds the commonality and the description in the information available about the individuals for that aspect. It uses the commonality and description to obtain similarity values for the individuals, using the above described Lin approach. It finally combines the information from different aspects to obtain an overall similarity measure.

As will be evident below, we describe a number of useful properties of similarity metrics and show how the inventive algorithm satisfies these properties. We also compare our metric with a pure taxonomy-driven metric on a sample ontology, and show a number of cases where the inventive algorithm is better than a pure taxonomy-driven metric. In particular, the inventive algorithm allows differentiating between individuals that may belong to the similar concepts, but which do not share much commonality in their relationships with other individuals. It also allows detecting the similarity between individuals of distant concepts in the taxonomy, which share a high degree of similarity in their relationships with other individuals.

As will be evident, principles of the invention provide many advantages. By way of example only, such advantages include: (i) the identification of a number of useful features for a similarity metric between individuals; (ii) generalization of Lin's similarity measure to find the similarity of two individuals in an ontology based on a DAG-taxonomy of concepts; (iii) an information-theoretic measurement of the similarity of two individuals taking into account their relationships with other individuals based on a specific property; and (iv) an information theoretic approach for combining different aspects for measuring similarity between two individuals.

Referring initially to FIG. 1, taxonomy 100 of a wine ontology generated by the World Wide Web Consortium (W3C) using OWL is shown. As explained above, ontologies provide a formal description of the kinds of entities and how they are related, and OWL ontologies describe concepts (or classes), properties and individuals (or instances) relevant to a certain domain. In FIG. 1, ellipses represent classes, rectangles represent individuals and trapezoids represent properties.

The taxonomy of the wine ontology shown in FIG. 1 describes different concepts such as Wine, RedWine and WineTaste. The different concepts are part of a taxonomy formed by subClassOf relationships between the concepts. This taxonomy is a DAG (directed acyclic graph) and includes different classes of wines and descriptors for wines. The ontology also describes properties that have a domain and a range. For instance, the domain of hasColor is Wine and the range is WineColor. The ontology also describes individuals (like Merlot and Red), which belong to one or more concepts and related to one another through various properties.

Ontologies describe terms using highly expressive and well-structured semantic graphs. This facilitates the discovery of interesting and unanticipated relationships between different concepts and individuals. One of these relationships, which is similarity of terms (concepts and individuals), is the problem that principles of the invention address. We now formally define the similarity problem.

An Ontology O is defines as a four-tuple (T, P, I, S):

T, which is O's taxonomy, is a hierarchy of C, the set of classes. Being an "is-a" or subclass-based hierarchy, every class in C represents a concept which is a specialization of the concept represented by its parent class. T is the organization of the elements in C as a DAG, but with one root only. This root represents the most general concept in the ontology (typically, "Thing").

P is a set of properties defined in O. Every property p∈P has a set of domain classes (denoted p.d) and a set of range classes (denoted p.r) explicitly defined for it, In this embodiment, we consider only OWL object properties, though the inventive algorithm can be extended to datatype properties as well.

I is the set of individuals in O. Each individual explicitly belongs to at least one class.

S is the set of statements in O. Elements in S describe class membership and relationships between individuals. Class membership statements are of the form (i∈X), where i∈I, X∈C Relations between individuals are represented as a triple (s, p, o), containing a subject, a predicate and an object. Here, s, o∈I (specifically, s∈p.d and o∈p.r), and p∈P.

For example, in the context of the wine ontology of FIG. 1, examples for statements in the set S are the triples (Merlot, hasColor, Red) and (Merlot, rdf:type, RedTableWine), which we abbreviate to Merlot∈RedTablewine.

We are interested in finding a measure for the semantic similarity of individuals in an ontology O. That is, a function that maps pairs of individuals to a totally ordered set and whose values are in line with intuition for similarity. Without loss of generality, the similarity can be considered to belong to the real-valued range [0,1]. Formally, we are looking for a function $f:I \times I \rightarrow [0,1]$. For the sake of comparison, most similarity measures described below are proposals of the function $g:C \times C \rightarrow [0,1]$.

Finding similar individuals is motivated by many kinds of investigative tasks; for example, to find how similar two products or patents are. Properties express a lot of information about individuals. Consider a concept in some ontology, in which every individual is associated with a color using a property. We would like to be able to say that two blue individuals are more similar to each other than a blue one and a red one. Moreover, we would like to consider similarity in the values so that light blue and dark blue individuals would be closer to each other than a black individual to a white one.

We now describe similarity between individuals in accordance with illustrative embodiments of the invention.

An OWL ontology gives different kinds of information about individuals. The information includes the concepts to which they belong and their relationships to other individuals based on different properties. In many scenarios, it is useful to consider the similarity between two individuals based on only a subset of all the information contained in the ontology. For example, it is sometimes useful to consider similarity based only on the values of a certain property, or a certain set of properties. In other cases, only the concept membership information may be considered relevant for calculating the similarity.

In order to achieve such fine control over the calculation of similarity, we first partition the space of information about different individuals into a number of different aspects. Each aspect only considers a portion of the information in the ontology. We then measure the similarity between individuals based on a certain aspect, or on a certain set of aspects. Below we describe the different kinds of aspects and some desired properties of the similarity measures for an aspect and for a set of aspects.

Classes are the representation of abstract concepts. We use "concept" to emphasize semantics and "class" to emphasize the hierarchical structure. In most cases both terms can be used interchangeably.

Principles of the invention provide for three kinds of aspects:

(1) Concept-Set-Similarity. This aspect measures the similarity between individuals based on the similarity of the sets of classes (or concepts) they belong to in the taxonomy. That is, it measures the similarity of individuals i and j based on the similarity of C(i) and C(j), where C(i) and C(j) represent the sets of classes that the individuals belong to. We denote this aspect by the symbol CS.

(2) Object-Set-Similarity. For a property, p, this aspect measures the similarity between two individuals, i and j, based on the similarity of the sets of objects in statements where these individuals are the subjects.

Note that an ontology-based statement typically includes a subject, a relationship, and an object (e.g., (banana, hasColor, yellow), where banana is an individual that is the subject of the statement, yellow is an individual that is the object of the statement, and hasColor is a relationship that represents a property in the ontology.)

Let $O_p(i)=\{o:(i, p, o) \in S\}$ and $O_p(j)=\{o:(j, p, o) \in S\}$. Then, this aspect measures the similarity of i and j in terms of the similarity between the object sets $O_p(i)$ and $O_p(j)$. We denote this aspect by the symbol OS(p).

(3) Subject-Set-Similarity. For a property, p, this aspect measures the similarity between two individuals i and j based on the similarity of the sets of subjects in statements where these individuals are the objects. Let $S_p(i)=\{s:(s, p, i) \in S\}$ and $S_p(j)=\{s:(s, p, j) \in S\}$. Then, this aspect measures the similarity of i and j in terms of the similarity between the subject sets $S_p(i)$ and $S_p(j)$. We denote this aspect by $SS(p)$.

For any ontology, $O(T, P, I, S)$, we can define $1+2|P|$ aspects. We refer to this set of aspects as A. If there are n properties in P of the form $p_1, \ldots, p_n$, then $A=\{CS, OS(p_1), \ldots, OS(p_n), SS(p_1), \ldots, SS(p_n)\}$.

We are interested in finding a measure for the similarity of individuals in an ontology O based only on a specific aspect. That is, a function $f_A$ s.t. (such that): $f_A:I\times I\rightarrow[0,1]$, which measures the similarity according to aspect A, s.t. $A\in A$.

In addition to the similarity based on a single aspect, we are also interested in finding a combined similarity measure for any set of aspects. We define the combined similarity function as $f_x^*:I\times I\rightarrow[0,1]$ where X is a set of aspects, i.e., $X\in 2^A$.

We now describe some desired features for a similarity metric between individuals. These features try to capture the intuition for similarity between individuals in an OWL ontology. Let i and j be two individuals. For any aspect, we would like to preserve Lin's intuitions on similarity: (i) increase with commonality, i.e., the more commonality i and j share with respect to aspect A, the greater the value of $f_A(i, j)$; (ii) decrease with difference, i.e., the more differences i and j have, with respect to aspect A, the lesser the value of $f_A(i, j)$; and (iii) maximum similarity under equality, i.e., the maximum similarity is between an individual and itself only; in other words, $(f_A(i,j)=1)\Leftrightarrow(i=j)$.

The same intuitions also hold for a combination of aspects and for the combined similarity metric. Based on these intuitions, there are a number (listed 1-9 below) of other desired features for the similarity metric.

(1) Propagation of Concept-Similarity

If two concepts are similar, then this similarity propagates to individuals that belong to these concepts.

Consider two concepts $C_i$ and $C_j$. Let individual i belong to $C_i$ and individual j belong to $C_j$. According to this intuition, the greater the commonality between $C_i$ and $C_j$, the higher is the similarity between i and j.

Let $f$ be the similarity metric defined for given classes. Consider a third concept, $C_k$, to which the individual k belongs. If i, j, k and l are not members of any other concepts, then, according to this intuition, If $f(C_i, C_j) \geq f(C_i, C_k)$, then $f_{cs}(i,j) \geq f_{cs}(i, k)$ Example. Let an ontology have the statements:

(banana$\in$Fruit), (carrot$\in$Vegetable), (raven$\in$Bird).

Assuming the individuals belong to no other concepts, then, in an ontology where $f$(Fruit, Vegetable)$\geq f$(Fruit, Bird), we expect $f_{cs}$(banana, carrot)$\geq f_{cs}$(banana, raven).

The same intuition can be easily extended to the case where an individual belongs to more than one concept. This can be done by considering the intersection of all the concepts to which the individual belongs.

(2) Propagation of Object-Similarity

If two individuals, a and b, are similar, then this similarity propagates to any other pair of individuals, i and j, that are related to a and b, respectively, by a property p. In particular, if a and b have a high concept-set-similarity, then i and j have high object-set-similarity for the property, p.

Assume the ontology has the following three statements on the property p, which are (i, p, a), (j, p, b) and (k, p, c). If i, j and k do not have other objects associated with them for property p, then this feature states the following intuition about Object-Set-Similarity:

If $f_{cs}(a, b) \geq f_{cs}(a, c)$ then $f_{os_{(p)}}(i,j) \geq f_{os_{(p)}}(i, k)$ Example. Consider the statements (banana, hasColor, yellow), (carrot, hasColor, orange), (raven, hasColor, black), Assume the subjects above have no other statements with the hasColor property. If in an ontology:

$f_{cs}$(yellow, orange)$\geq f_{cs}$(yellow, black), then $f_{os_{(p)}}$(banana, carrot)$\geq f_{os_{(p)}}$(banana, raven).

The same feature can be extended to the case where the subjects have multiple object values for a property.

(3) Propagation of Subject-Similarity

This is a dual of the above feature. If two subjects are very similar, then this similarity propagates to the objects they are related to by a property. Again, consider the statements: (i, p, a), (j, p, b) and (k, p, c). If a, b and c do not have other objects associated with them for property p, If $f_{cs}(i,j) \geq f_{cs}(i, k)$, then $f_{ss_{(p)}}(a, b) \geq f_{ss_{(p)}}(a, c)$ Example. Consider the statements (cream, usedInMaking, coffee), (milk, usedInMaking, hot-chocolate), (glass, usedInMaking, window).

Assume the objects above have no other statements with the hasColor property. In an ontology where $f_{cs}$(cream, milk)$\geq f_{cs}$(cream, glass), then $f_{ss_{(p)}}$(coffee, hot-chocolate)$\geq f_{ss_{(p)}}$(coffee, window).

(4) Inverse Dependence on Concept Cardinality

If i and j belong to a concept represented by a class C, that has a small cardinality (small number of elements), then the individuals have a high concept-set-similarity. Intuitively, this means that they share a piece of information which is rare (since there are only a few individuals that belong to C), and therefore, the information content in their commonality is higher.

Let $i\in C$, $j\in C$, $k\in D$, $l\in D$. Assuming that i, j, k and l do not belong to any other class, If $|C|<|D|$, then $f_{cs}(i,j)>f_{cs}(k, l)$ where $|C|$ is the cardinality of C.

Example. Assume that in an ontology there are 100 individuals in the concept Drink, but only 3 individuals in the concept Fruit. In the context of this ontology, two individuals which are fruits share greater commonality than individuals which are drinks.

(5) Inverse Dependence on Subject-Set Cardinality

If i and j share a "rare" object value, x, for a property p, then the information content in their commonality is higher. In other words, if the cardinality of the set of individuals that are the subjects of statements with the property p and the object o, is small, then i and j share a rare piece of information, and are hence their object-set similarity is higher.

Let (i, p, x), (j, p, x), (k, p, y), (l, p, y) be statements in the ontology. Assuming that i, j, k and l are not the subjects of any other triples with the property p, If $|S_p(x)|<|S_p(y)|$, then $f_{os_{(p)}}(i,j)>f_{os_{(p)}}(k, l)$ where $|S_p(x)|$ is the number of individuals that are the subjects of statements with the property p and the object x.

Example. Assume that an ontology of cars describes that the color of many cars is white, but very few cars have the color purple. Then assuming that a car has just one color value, two purple cars are more similar to each other than two white cars in a similarity measure based on this aspect.

(6) Inverse Dependence on Object-Set Cardinality

This is the dual of the previous feature. Let (i, p, x), (i, p, y), (j, p, z), (j, p, w) be statements in the ontology. Assuming that x, y, z and w are not the objects of any other triples with the property p.

If $|O_p(i)|<|O_p(j)|$, then $f_{ss_{(p)}}(x, y)>f_{ss_{(p)}}(z, w)$.

(7) Commutativity $f_A(i,j)=f_A(j,i)$ for any aspect, A.

(8) Minimum Similarity Under Disjointness

When there is no information content in the commonality between i and j with respect to some aspect A, then $f_A(i,j)=0$.

Following from this point, for a property p, if $|O_p(i)|=0$ or if $|O_p(j)|=0$ then $f_{os_{(p)}}(i,j)=0$. This is because if either individual is not the subject of any statement on the property p, then the commonality based on this aspect is 0. Similarity, if $|S_p(i)|=0$ or if $|S_p(j)|=0$ then $f_{ss_{(p)}}(i,j)=0$.

(9) Monotonic Nature of Combined Similarity

The similarity between two individuals can only increase as more aspects are considered. This follows from the open world assumption on which OWL is based, and the monotonic nature of description logics. That is, new information from new aspects cannot cause existing information to become false or invalid (unless it causes the ontology to become logically inconsistent; however, we assume that the ontologies are consistent).

Formally, let X and X' be two sets of aspects. If $X \subseteq X'$, then $f_X(i,j) \leq f_{X'}(i,j)$.

This does not mean that individuals become more similar as more aspects are considered. Relative similarity can change as more aspects are considered.

We now describe similarity based on a single aspect.

In order to find the similarity of two individuals based on a single aspect, we need to come up with sufficient measures that capture the description and commonality of two individuals based on the aspect. Once we have these measures, we can compute the similarity of the individuals.

A. Concept-Set-Similarity Measure

Concept-Set-Similarity considers only concept membership statements of individuals. We define the description of an individual and commonality between two individuals based on the concepts to which they belong.

In order to compute the description of an individual, we define a new virtual class of size one (1), and make the individual the only member of this virtual class. We call this new class a virtual class since it did not exist in the original ontology.

For an individual, i, let its virtual class be denoted by $V_i$. If, in the ontology, i belongs to a set of concepts, C(i), then each concept in C(i) is a superclass of $V_i$.

Figure 2:
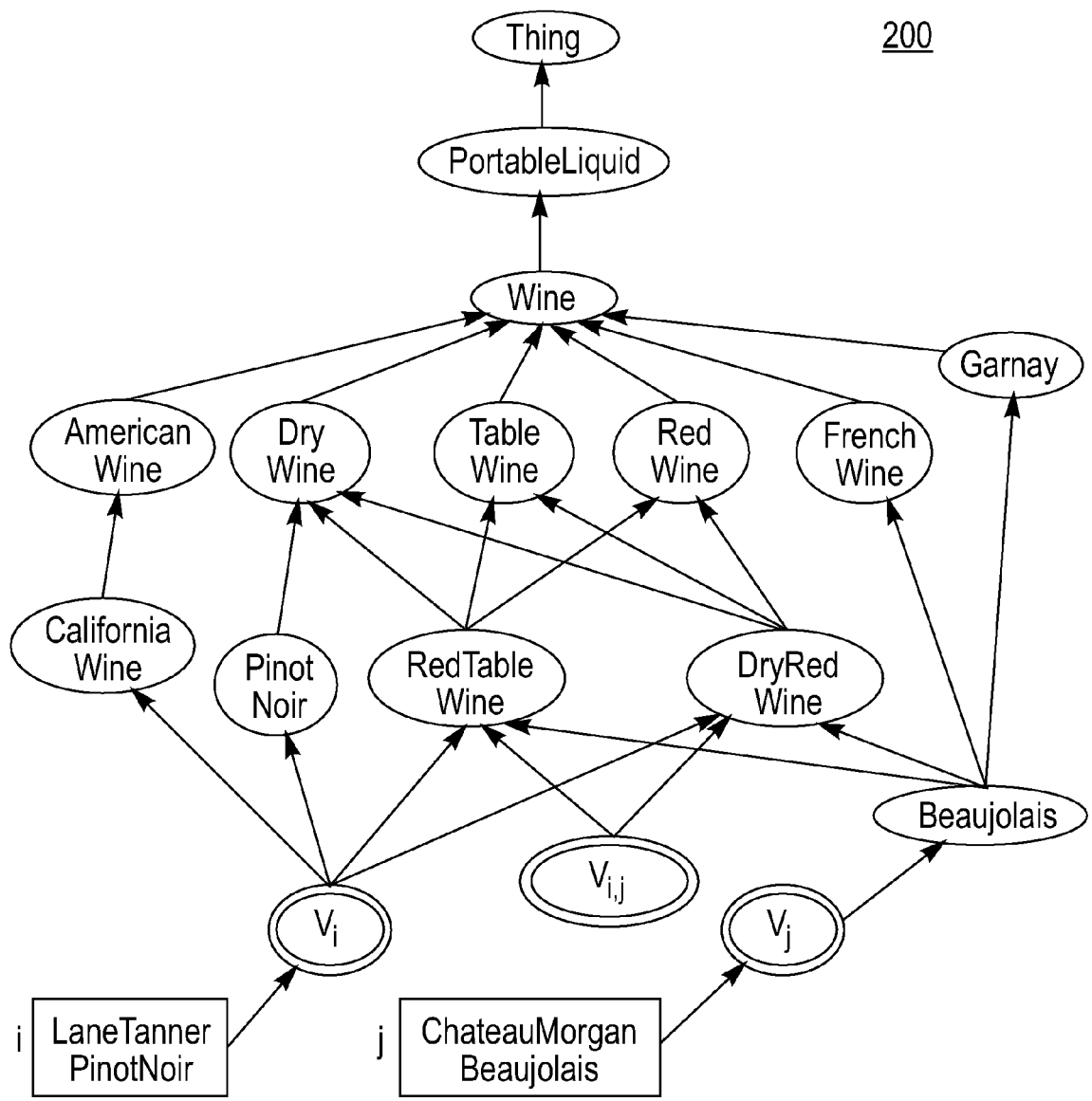
FIG. 2 illustrates a taxonomy resulting from computation of a concept-set-similarity measure, according to an embodiment of the invention.

For example, consider two individuals in taxonomy 200 of the wine ontology in FIG. 2, i=LaneTannerPinotNoir and j=ChateauMorgonBeaujolais. Double ellipses represent $V_i$ and $V_j$, the virtual classes of the two individuals.

The definition of the virtual class helps in capturing the fact that an individual has a unique identity. The description of the individual is in terms of its membership to this virtual class, i.e., Desc(i)={i∈$V_i$}. The information content of the description is the probability that a random individual satisfies the statement in the description, i.e., the probability that a random individual belongs to $V_i$. Since the size of $V_i$ is 1, $I(Desc(i))=-\log(1/|I|)$.

In order to calculate the commonality between two individuals i and j, we first expand the descriptions to include other concept membership statements that can be inferred based on the concept taxonomy.

ExpDesc(i)={(i∈C): C is an ancestor of $V_i$}, and

ExpDesc(j)={(j∈C): C is an ancestor of $V_j$}.

In the example in FIG. 2, the expanded descriptions of i and j include all the superclasses of $V_i$ and $V_j$:

ExpDesc(i) = {(i ∈ $V_i$), (i ∈ PinotNoir),
= (i ∈ RedTableWine), (i ∈ DryWine), ...}

ExpDesc(j) = {(j ∈ $V_j$), j ∈ Beaujolais),
= (j ∈ DryRedWine), (j ∈ RedTableWine), ...}

We define commonality as a pair of class membership statements for classes that appear in both the expanded descriptions.

Comm(i,j)={(i∈C), (j∈C): (i∈C)∈ExpDesc(i)∧(j∈C)
∈ExpDesc(j)} i.e., Comm(i,j)={(i∈C), (j∈C): C is an ancestor of $V_i$ and $V_j$}.

The information content in the commonality is the probability that a pair of random individuals satisfies the pair of class membership statements in the commonality. Let C(i,j) denote the set of classes that are the least common ancestors of $V_i$ and $V_j$. It is sufficient to consider the classes in C(i,j) for, calculating commonality since membership to all common ancestors can be derived from the set of least common ancestors.

Let $V_{i,j}$ denote the intersection of all the classes in C(i, j). We call $V_{i,j}$ the lca-intersection class (or least common ancestors intersection class) for individuals i and j for the aspect CS.

$I(Comm(i,j))=-\log(p[(x∈V_{i,j})^\wedge(y∈V_{i,j})])$, or $I(Comm(i,j))=-2\cdot\log(|V_{i,j}|/|I|)$ Hence $f_{cs}(i,j) = \dfrac{I(Comm(i,j))}{I(Desc(i))+I(Desc(j))}$ $= \dfrac{-2\cdot\log(|V_{i,j}|/|I|)}{-\log(1/|I|)-\log(1/|I|)}$ $= \dfrac{\log(|V_{i,j}|/|I|)}{\log(1/|I|)}$ In the example discussed above, C(i, j)={RedTableWine, DryRedWine}. The number of individuals in $V_{i,j}$, the intersection of these two classes is 25. The number of individuals in the wine ontology is 206. Therefore, $I(Comm(i,j))=-2\cdot\log(25/206)$. Thus, the measure of concept-set-similarity is:

$f_{cs}(i,j) = \dfrac{-2\cdot\log(25/206)}{(-\log(1/206))+(-(\log(1/206)))} = 0.395$ The concept $V_{i,j}$ contains at least two individuals, i and j. If there are only a few other individuals that belong to $V_{i,j}$, then the information content in the commonality is large, and, thus, the similarity between i and j is high.

We show that the concept-set-similarity metric satisfies several of the desired features described above.

It is easy to prove that the similarity measure is inversely dependent on concept cardinality, which is one of the desired features of a similarity metric. Consider four individuals, i, j, k and l, such that, i∈C, j∈C, k∈D, l∈D. Assuming that i, j, k and l do not belong to any other class, it can be seen that $V_{i,j}$=C and $V_{k,l}$=D.

Thus, if |C|<|D|, then $f_{cs}(i,j)>f_{cs}(k,l)$.

The metric is commutative since it does not depend on the order of considering i and j. Also, the maximum value of similarity occurs when we compare an individual to itself. The lca-intersection class in this case is the same as the virtual class defined for the individual. Thus, $f_{cs}(i, i)=1$.

In addition, we can prove that this similarity metric satisfies the propagation of concept-similarity feature in the case of a tree-based taxonomy. Consider concepts $C_i$, $C_j$ and $C_k$, to which individuals i, j and k respectively belong. Assume that i, j and k do not belong to any other concepts. Since, we are considering a tree-based taxonomy, $C_i$ and $C_j$ have exactly one least common ancestor, which is, in fact, the same as $V_{i,j}$. Similarly, the least common ancestor of $C_i$ and $C_k$ is $V_{i,k}$.

If $f(C_i, C_j) \geq f(C_i, C_k)$, then, in a tree-based taxonomy, it means that either $V_{i,j}$ is the same as $V_{i,k}$ or $V_{i,j}$ is below $V_{i,k}$ in the taxonomy. This is because, in such a taxonomy, all the ancestors of $C_i$ are along the path from $C_i$ to the root. Thus, $V_{i,k}$ is an ancestor of $V_{i,j}$; hence any instance of $V_{i,k}$ is also an instance of $V_{i,j}$. As a result, $|V_{i,k}| \leq |V_{i,j}|$. Since the concept-set-similarity of two individuals depends on the cardinality of their virtual lca-intersection class, $f_{cs}(i, j) \geq f_{cs}(k, l)$.

B. Object-Set-Similarity Measure

We now consider the similarity between i and j based on statements where i and j are the subjects and the predicate is a certain property, p.

Just as in the case of concept-set-similarity, the individual can be considered to belong to a virtual class of size one (1), and the description can be defined in terms of its membership to this virtual class. However, this virtual class is different from the $V_i$ that we defined for concept-set-similarity. It is not associated with the class taxonomy defined in the ontology, but is associated with a different taxonomy that can be defined based on the range of property p.

We now describe how this new taxonomy can be built. Let us first consider the information known about i for this aspect. Let $O_p(i)$ be the set of objects in statements where i is the subject and p is the predicate. $O_p(i) = \{g_1, g_2, \ldots, g_m\}$. For each $g_k$, $k=1, \ldots, m$, we construct a new virtual class, $V(p, g_k)$, that represents the set of all individuals that are related by property p to object $g_k$. Note that these virtual classes did not exist in the original ontology.

For an individual, i, let the virtual class it belongs to, based on the property p, be denoted by $V_i(p)$. The super-classes of $V_i(p)$ are $V(p, g_k)$ where $g_k \in O_p(i)$.

Now, $Desc(i) = \{i \in V_i(p)\}$. The information content of the description is the probability that a random individual satisfies the statement in the description, i.e., the probability that a random individual belongs to $V_i(p)$. Since the size of $V_i(p)$ is 1, $I(Desc(i)) = -\log(1/|I|)$.

If individual i is not the subject of any statement with property p, i.e., $|O_p(i)|=0$, then the only superclass of its virtual class, $V_i(p)$, is the root class of the taxonomy.

Figure 3:
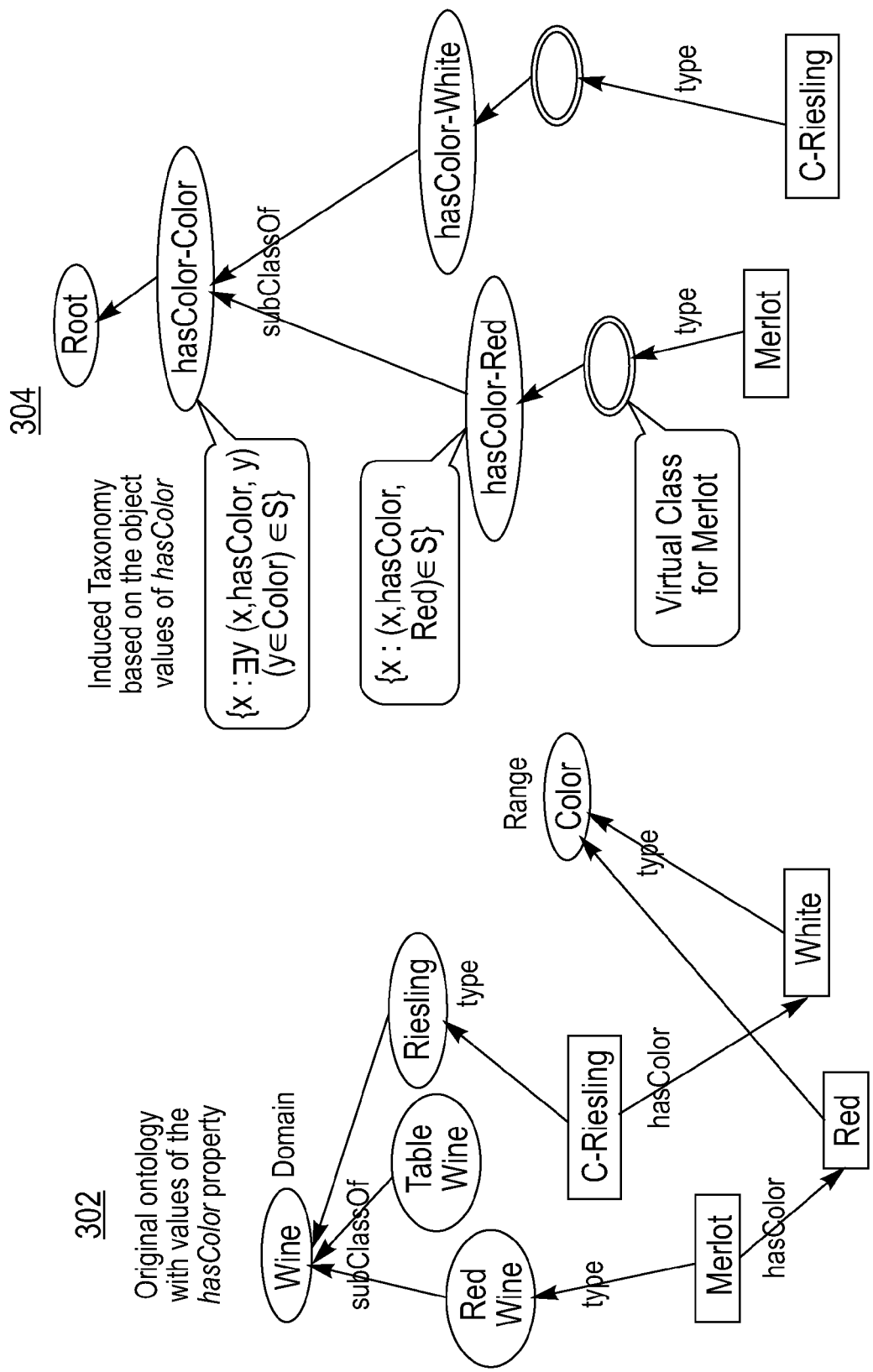
FIG. 3 illustrates a taxonomy resulting from computation of an object-set-similarity measure, according to an embodiment of the invention.

We illustrate this in FIG. 3. In the original taxonomy (left graph labeled 302), the individuals C-Riesling and Merlot are related via the hasColor property to the individuals Red and White, respectively. In order to calculate the description of Merlot, we first create a virtual class called $V_{Merlot}$(hasColor) (denoted by a double ellipse in the right graph labeled 304) for this individual. In addition, we create a virtual class, V(hasColor, Red), to represent the set of individuals that are related by the hasColor property to Red. In the diagram (right graph labeled 304), this is represented as hasColor-Red for the sake of readability. Now, $O_{hasColor}$(Merlot)={Red}. Thus, the virtual elms of Merlot, $V_{merlot}$(hasColor), is a subclass of V(hasColor, Red).

In order to calculate the commonality, we first expand the descriptions to include other statements that can be inferred based on the object-set of i for property p and the taxonomy associated with the range of p.

The classes $V_i(p)$ and $V_j(p)$ will be a part of a taxonomy that we now build, called OS(p)-induced taxonomy. As described earlier, the superclasses of $V_i(p)$ are $V(p, g_k)$ where $g_k \in O_p(i)$. Similarly, the superclasses of $V_j(p)$ are $V(p, h_l)$ where $h_l \in O_p(j)$.

Consider any individual, $g_k$, that satisfies (i, p, $g_k$). Now, $g_k$ itself belongs to one or more classes, some subset of which lies in the range of p. Let one such classes to which $g_k$ directly belongs be C. Then, $V(p, g_k)$ has a superclass whose members consists of all those individuals that are related by property p to some individual that happens to be of type C. We denote this superclass as $V(p, C)$ (and as p-C in the figures). To state it more formally, $$V(p, C) = \{s : \exists x (s, p, x) \wedge x \in C\}.$$

For example, in FIG. 3, the class hasColor-Red is a subclass of hasColor-Color, since in the original taxonomy, (Red∈Color). The class hasColor-Color represents the set of individuals that are related by the hasColor property to some individual that is of type Color.

Hence, we can construct a taxonomy based on the virtual classes. This taxonomy exactly reflects the portion of the concept taxonomy that is rooted at the classes in the range of p, i.e., under p.r. We call this taxonomy the OS(p)-induced taxonomy since it is induced based on the set of object values of the property p, as shown in FIG. 3. The root of the induced taxonomy is the class root, to which all individuals belong. If an individual has no value for a property, its virtual class is a direct subclass of root.

The commonality between two individuals based on the object-set-similarity aspect can now be defined based on this induced taxonomy. The similarity between virtual classes in this taxonomy can be calculated in the same way as was done for classes in the original taxonomy. That is, we construct expanded descriptions of i and j based on the OS(p)-induced taxonomy:

$$ExpDesc(i) = \{(i \in C): C \text{ is an ancestor of } V_i(p)\}, \text{ and}$$

$$ExpDesc(j) = \{(j \in C): C \text{ is an ancestor of } V_j(p)\}$$

The commonality is defined as a pair of class membership statements on classes that appear in the expanded descriptions of i and j, or:

$$Comm(i, j) = \{(i \in C), (i \in C): C \text{ is an ancestor of } V_i(p) \text{ and } V_j(p)\}.$$

The information content in the commonality is the probability that a pair of random individuals satisfies the pairs of class membership statements in the commonality. Let C(i,j) denote the set of classes that are the least common ancestors of $V_i(p)$ and $V_j(p)$. Note that these classes lie in the OS(p)-induced taxonomy. And let $V_{i,j}(p)$ denote the intersection of all the classes in C(i, j). We call $V_{i,j}(p)$ the lca-intersection class for i and j for the aspect OS(p).

$$I(Comm(i,j)) = -\log(p[(x \in V_{i,j}(p))^{\wedge}(y \in V_{i,j}(p))]), \text{ or}$$

$$I(Comm(i, j)) = -2 \cdot \log(|V_{i,j}(p)|/|I|)$$

$$\text{Hence } f_{os(p)}(i, j) = \frac{I(Comm(i, j))}{I(Desc(i)) + I(Desc(j))}$$

$$= \frac{\log(|V_{i,j}(p)|/|I|)}{\log(1/|I|)}$$

To summarize, to calculate the similarity of two individuals i and j, we first define new virtual classes for these individuals. We then construct the relevant portions of the OS(p)-induced taxonomy in order to find the set of least common ancestors of the new virtual classes. Finally, we find the intersection of these classes, and use that to calculate the commonality.

The OS(p)-induced taxonomy helps in organizing all individuals based on the value of their property, p. For example, based on this aspect, two wines that have the same color, red, are more similar to each other than a red wine and white wine. Also, a red wine and a white wine are more similar to each other than two individuals that do not have any color associated with them.

In FIG. 3, we have i=Merlot and j=C-Riesling. The lca-intersection class, $V_{i,j}$(hasColor), is the virtual class V(hasColor, Color). This is the set of all wines that have a value for the property hasColor. From the ontology, |V(hasColor, Color)|=52. The similarity of Merlot and C-Riesling based on this aspect is therefore $$\frac{\log(52/206)}{\log(1/206)} = 0.258.$$

For Merlot and ChateauMorgonBeaujolais, that are both red, the lca-intersection class is |V(hasColor, Red)|, the cardinality of which is 26. Thus $$\text{similarity} = \frac{\log(26/206)}{\log(1/206)} = 0.388.$$

Thus, according to our metric, the similarity between two red wines is more than the similarity between a red wine and a white wine, which, in fact, meets our intuition.

Note that the set $V_{i,j}$(p) contains at least two individuals, i and j. If there are only a few other individuals that belong to $V_{i,j}$(p), then it means that relatively few individuals have an object value of a property p that belongs to the least common ancestors of $V_i$(p) and $V_j$(p). In this case, the information content in the commonality is large, and hence the similarity between i and j is high.

We show that the object-set-similarity metric satisfies several of the desired features described above.

It is easy to prove that the similarity measure is inversely dependent on subject-set cardinality. Let (i, p, x), (i, p, x), (k, p, y), (l, p, y) be statements in the ontology. Assume that i, j, k and l are not the subjects of any other triples with the property p. Then, it can be seen that $V_{i,j}(p)=S_p(x)$, where $S_p(x)$ represents the set of all subjects that are related via property p to the object x. Similarly, $V_{k,l}(p)=S_p(y)$. Thus, if $|S_p(x)|<|S_p(y)|$, then $f_{os_{(p)}}(i, j) > f_{os_{(p)}}(k, l)$.

It is also clear that the metric is commutative. Also, $f_{os_{(p)}}(i, i)=1$ because $V_{i,i}$(p) is the same as $V_i$(p). Hence, the maximum value of similarity occurs when we compare an individual to itself.

In addition, we can prove that this similarity metric satisfies the propagation of object-similarity feature in the case of an ontology that has a tree-based concept taxonomy. Assume the ontology has the following statements on the property p, which are (i, p, a), (i, p, b) and (k, p, c). Assume that i, j and k do not have other objects associated with them for property p. Since the OS(p)-induced taxonomy is based on the concept taxonomy under p.r (the range of p), the lca-intersection concept for the OS(p) aspect for i and j (denoted by $V_{i,j}$(p)) is defined in terms of the lca-intersection concept for the CS aspect for a and b (denoted by $V_{a,b}$), i.e., $V_{i,j}(p)=V(p,V_{a,b})=\{s: \exists x, (s, p, x) \wedge x \in V_{a,b}\}$ If $f_{cs}(a, b) \geq f_{cs}(a, c)$, then, in a tree-based taxonomy, it means that either $V_{a,b}$ is the same as $V_{a,c}$ or $V_{a,b}$ is below $V_{a,c}$ in the taxonomy. This implies that in the OS(p)-induced taxonomy, either $V_{i,j}$(p) is the same as $V_{i,k}$(p) or $V_{i,j}$(p) is below $V_{i,k}$(p). Hence, $|V_{i,j}(p)| \leq |V_{i,k}(p)|$ and, $f_{os_{(p)}}(i,j) \geq f_{os_{(p)}}(i, k)$.

C. Subject-Set-Similarity Measure

We now describe subject-set-similarity for a certain property.

Figure 4:
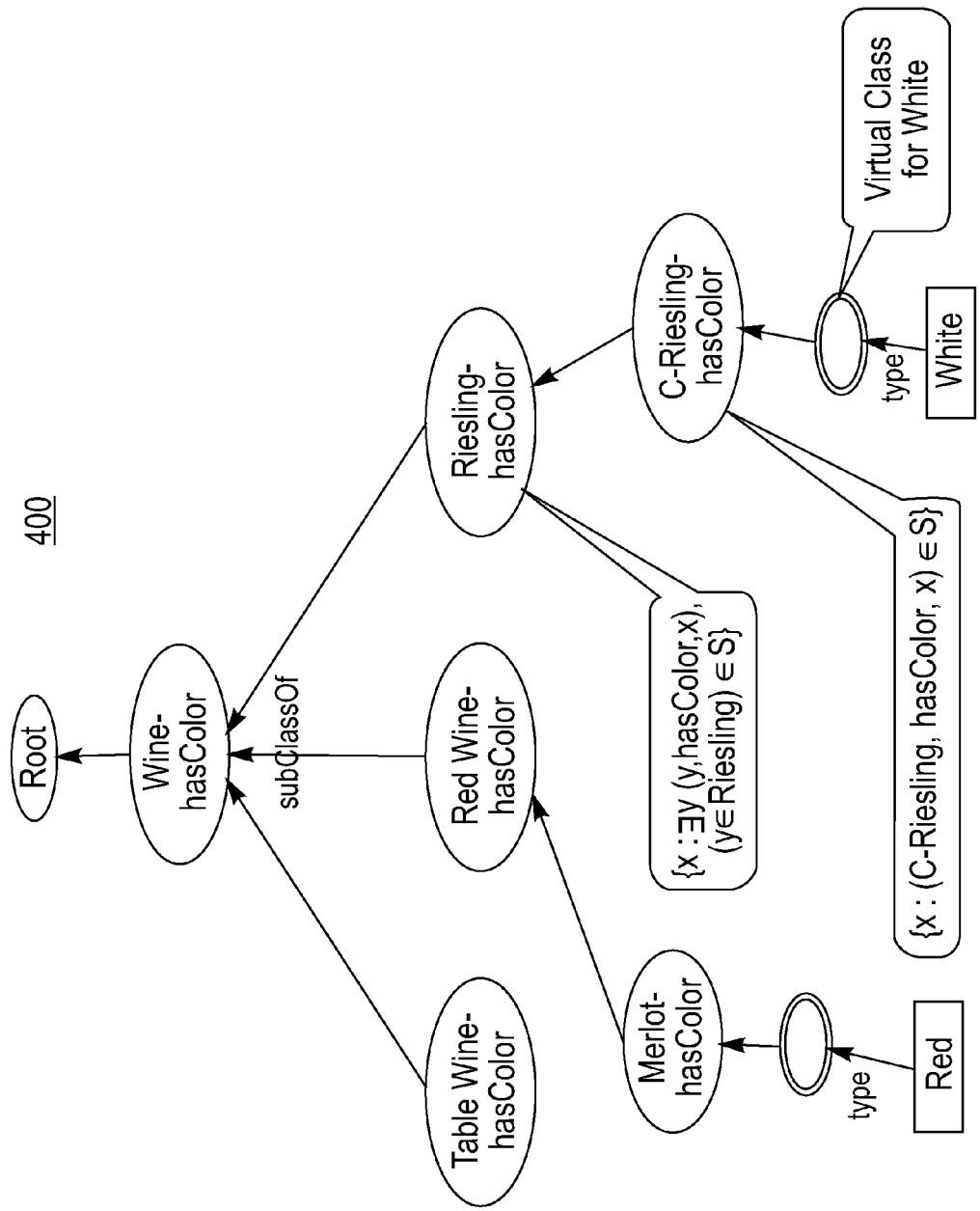
FIG. 4 illustrates a taxonomy resulting from computation of a subject-set-similarity measure, according to an embodiment of the invention.

The Subject-Set-Similarity for two individuals i and j for a property p is calculated in a similar manner to the Object-Set-Similarity. FIG. 4 shows taxonomy 400. We first define new virtual classes for these individuals. We then construct the relevant portions of the SS(p)-induced taxonomy in order to find the set of least common ancestors of the new virtual classes. Finally, we find the intersection of these ancestor classes, and use that to calculate the commonality. Since this process is exactly the dual of the process for the Object-Set-Similarity, and for the sake of brevity, we do not go into the details of the process again. The features of the Subject-Set-Similarity metric are also similar to the features of Object-Set-Similarity.

D. Combining Similarity Measures

We now consider the similarity between i and j based on information from multiple aspects, i.e., a combined similarity measure that considers two or more of the single measures described above.

Above, we showed how, for the concept-set-similarity aspect and the subject-set and object-set similarity aspects, we were able to reduce the description of an individual to a statement indicating its membership to a virtual class of size one. This virtual class was associated with different taxonomies for the different aspects. For the concept-set-similarity aspect, the taxonomy was the one defined in the ontology (with individual-associated virtual classes). For the object-set and subject-set similarity aspects, we induced new taxonomies by defining new virtual classes based on the relationships between individuals based on some property.

In order to combine information from different aspects, we merge the taxonomies associated with the different aspects. We now describe how we generate the merged taxonomy.

Let us first consider the case of two aspects, $A_1$ and $A_2$. Let the virtual classes defined for an individual, i, for these aspects be $Vi(A_1)$ and $Vi(A_2)$. In the new merged taxonomy, we combine the virtual classes to create a new virtual class $Vi(A_1, A_2)$. This size of this virtual class is again one; it only contains the individual, i. The superclasses of this new virtual class includes all the superclasses of $Vi(A_1)$ and $Vi(A_2)$. The description of an individual is now a statement indicating its membership to this new virtual class.

$$Desc(i)=\{i \in V_1(A_1,A_2)\}$$

Figure 5:
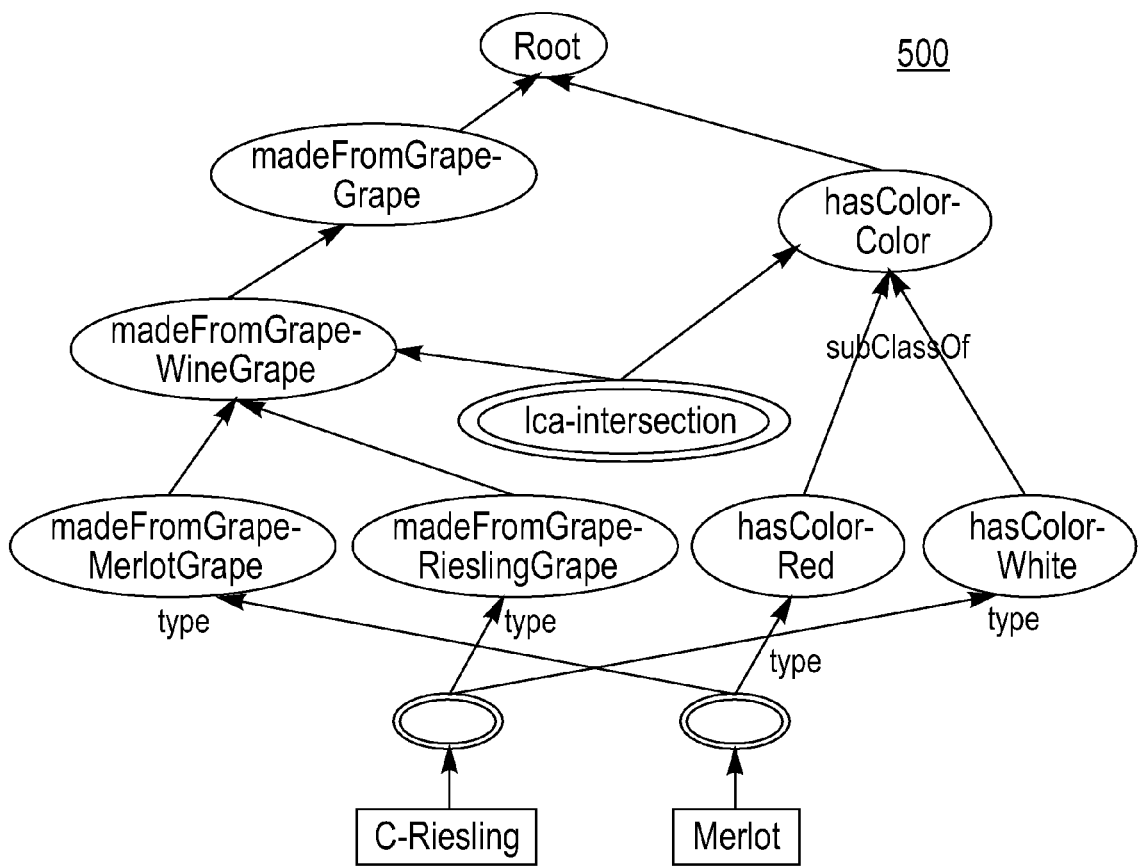
FIG. 5 illustrates a resulting taxonomy from merging two or more taxonomies resulting from computation of similarity measures, according to an embodiment of the invention.

For example, consider the individuals Merlot and C-Riesling in taxonomy 500 in FIG. 5. The induced taxonomies associated with the properties hasColor and madeFromGrape are shown. We define new virtual classes for the individuals, represented by double ellipses, that are subclasses of the appropriate induced virtual classes in the respective taxonomies.

In order to calculate the commonality between two individuals, we first expand the descriptions to include other statements that can be inferred based on the taxonomies of the two aspects.

$$ExpDesc(i)=\{(i \in C): C \text{ is an ancestor of } V_i(A_1, A_2)\},$$

$$ExpDesc(j)=\{(j \in C): C \text{ is an ancestor of } V_j(A_1, A_2)\}$$

As before, the commonality is defined as pairs of class membership statements:

$Comm(i,j) = \{(i \in C), (j \in C): C \text{ is an ancestor of } V_i(A_1, A_2) \text{ and } V_j(A_1, A_2)\}$ The information content in the commonality is the probability that a pair of random individuals satisfies the pair of class membership statements in the commonality. Let $C_{i,j}(A_1, A_2)$ denote the set of classes that are the least common ancestors of $V_i(A_1, A_2)$ and $V_j(A_1, A_2)$. And let $V_{i,j}(A_1, A_2)$ denote the intersection of the individuals in the classes in $C_{i,j}(A_1, A_2)$. We call $V_{i,j}(A_1, A_2)$ the lca-intersection class for i and j based on aspects $A_1$ and $A_2$.

$I(Comm(i,j)) = -\log(p[(x \in V_{i,j}(A_1,A_2)) \char`\^ (y \in V_{i,j}(A_1,A_2))])$ i.e., $I(Comm(i,j)) = -2 \cdot \log(|V_{i,j}(A_1,A_2)|/|I|)$.

A naive way of obtaining the intersection class $V_{i,j}(A_1, A_2)$ is to create intersection classes for every pair of classes in the two taxonomies. However, a very useful optimization is based on the insight that the intersection class $V_{i,j}(A_1, A_2)$ can be calculated by intersecting the virtual intersection classes for the two aspects.

Let the virtual intersection class that were generated for aspects $A_1$ and $A_2$ be $V_{i,j}(A_1)$ and $V_{i,j}(A_2)$. Then $V_{i,j}(A_1, A_2) = V_{i,j}(A_1) \cap V_{i,j}(A_2)$. The reason for this is if any individual, x, belongs to both $V_{i,j}(A_1)$ and $V_{i,j}(A_2)$, then it has to belong to $V_{i,j}(A_1, A_2)$.

$$\text{Finally, } f_{A_1,A_2}(i,j) = \frac{\log(|V_{i,j}(A_1,A_2)|/|I|)}{\log(1/|I|)}$$

The above method can be extended for any number of aspects, say $A_1, A_2, \ldots, A_n$. The taxonomy for each additional aspect can be incrementally merged with the existing combined taxonomy.

For example, FIG. 5 shows the lca-intersection class for Merlot and C-Riesling. It includes 46 individuals that belong to both hasColor-Color and madeFromGrape-WineGrape. The similarity based on the two aspects is:

$$\frac{-2 \cdot \log(46/206)}{-\log(1/206) - \log(1/206)} = 0.281.$$

Now, let us consider, a third aspect, the object-set-similarity based on the property, locatedIn (not shown in the figure). The two individuals have the same value, NewZealandRegion, for this property. In the induced taxonomy for the property locatedIn, seven individuals are in the class locatedIn-NewZealandRegion. When we merge the three induced taxonomies, the new lca-intersection class has six individuals. Based on the three properties only, the similarity is:

$$\frac{-2 \cdot \log(6/206)}{-\log(1/206) - \log(1/206)} = 0.664.$$

The example above showed one of the desired features of a similarity metric, viz. the monotonic nature of combined similarity. We now prove that our metric does indeed satisfy the monotonicity feature in the general case.

Let X and X' be sets of aspects, and let $X \subseteq X'$. Since our algorithm for constructing the merged taxonomy is incremental, we can construct the merged taxonomy corresponding to X' by first constructing the merged taxonomy for X and then incrementally adding in the remaining aspects in X'-X. Now, the individuals in the lca-intersection class for X' will be a subset of the individuals in the lca-intersection class for X. Hence, $|V_{i,j}(X)| > |V_{i,j}(X')|$, and thus $f_X(i,j) \leq f_{X'}(i,j)$.

Figure 6A:
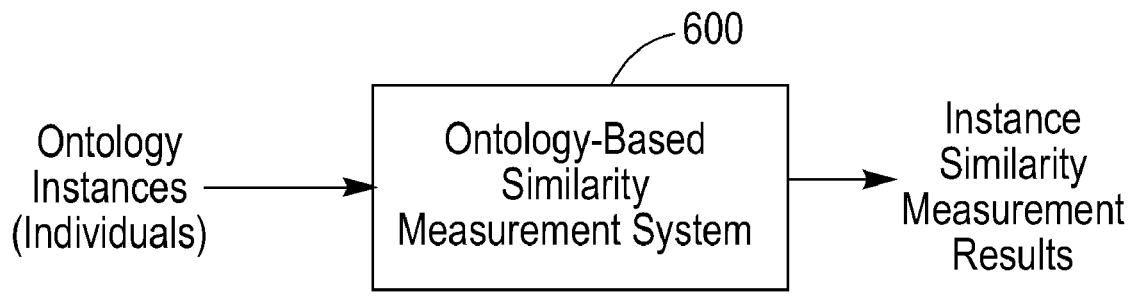
FIG. 6A illustrates a system for measuring similarity of individuals associated with an ontology, according to an embodiment of the invention.

Referring now to FIG. 6A, a system for measuring similarity between individuals in an ontology is show. As shown, given individuals associated with an ontology, system 600 computes the various similarity metrics described above so as to return similarity results for the individuals. That is, system 600 computes a concept-set-similarity measure, an object-set-similarity measure and a subject-set-similarity measure. While the system can compute the various measures individually, it can also compute a combination of two or more of the measures to form a combined measure.

Figure 6B:
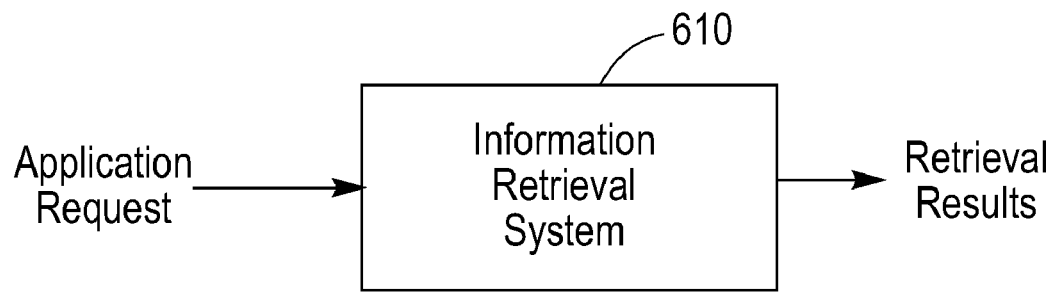
FIG. 6B illustrates an information retrieval system, according to an embodiment of the invention.

It is to be appreciated that similarity measures associated with the individuals of the subject ontology may be used by an information retrieval system. For example, as shown in FIG. 6B, information retrieval system 610 receives a request (e.g., query) for information from an application. System 610 utilizes the similarity measures computed by similarity measurement system 600 (FIG. 6A) when retrieving results that satisfy the application request.

Figure 7:
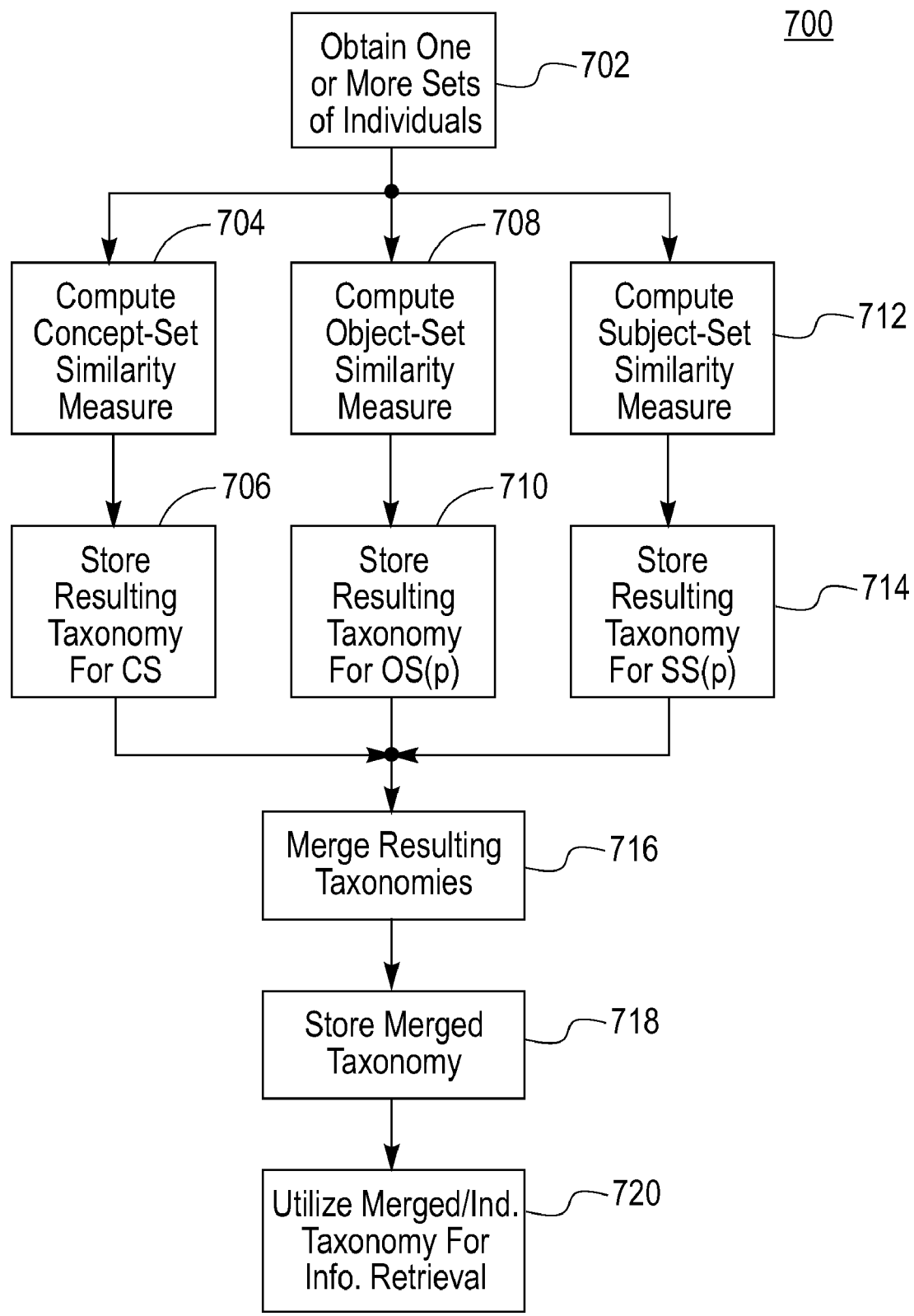
FIG. 7 illustrates a methodology for measuring similarity of individuals associated with an ontology, according to an embodiment of the invention.

Referring now to FIG. 7, flow chart 700 depicts individual similarity measurement methodology according to an embodiment of the invention. That is, FIG. 7 illustrates overall steps performed by an algorithm 700 employing the above described similarity metrics and aspects. System 600 in FIG. 6A may perform the steps of algorithm 700.

In step 702, one or more sets of individuals (instances) are obtained.

In step 704, a concept-set-similarity measure is computed, as described above, for the one or more sets of individuals.

In step 706, a taxonomy resulting from the computation of the concept-set-similarity measure is stored.

In step 708, an object-set-similarity measure is computed, as described above, for the one or more sets of individuals.

In step 710, a taxonomy resulting from the computation of the object-set-similarity measure is stored.

In step 712, a subject-set-similarity measure is computed, as described above, for the one or more sets of individuals.

In step 714, a taxonomy resulting from the computation of the subject-set-similarity measure is stored.

In step 716, two or more of the resulting taxonomies are merged, as described above.

In step 718, the merged taxonomy is stored.

In step 720, the merged taxonomy (from step 716) or one or more individual taxonomies (from steps 704, 708 and 712) are utilized for information retrieval in response to an application query (see FIG. 6B above).

Figure 8:
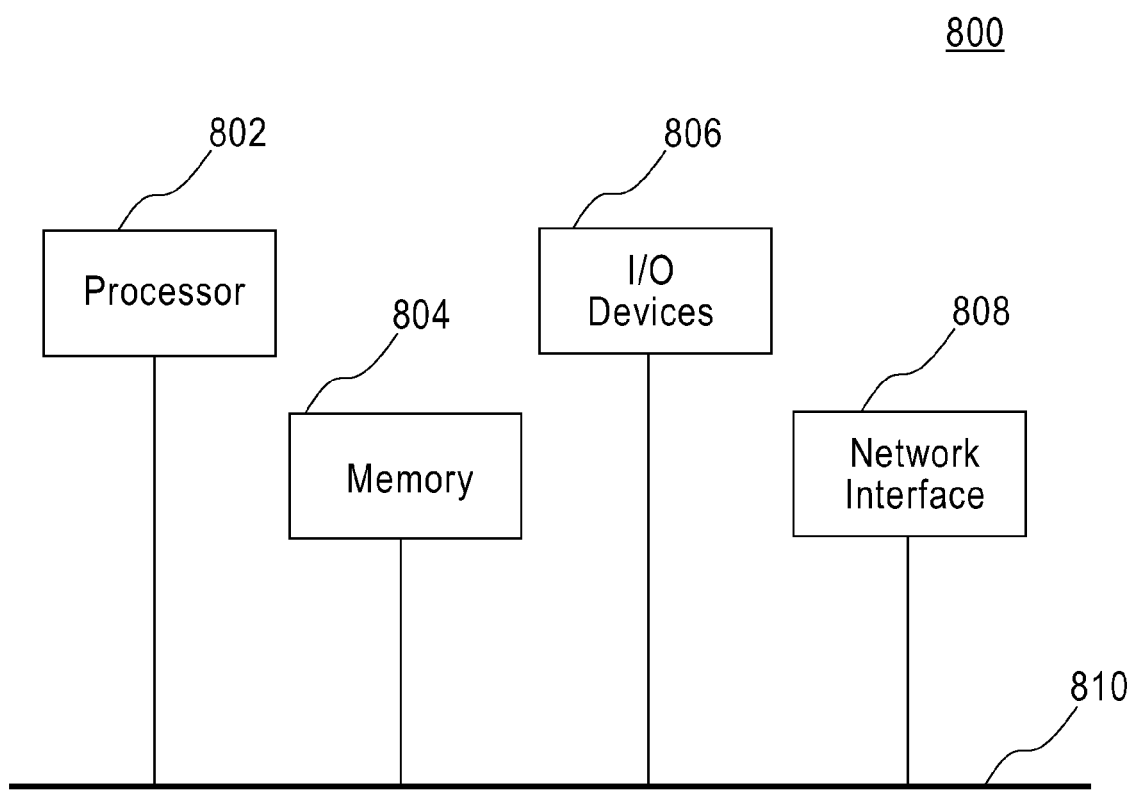
FIG. 8 illustrates a computer system architecture for implementing a similarity measurement system, according to an embodiment of the invention.

Referring lastly to FIG. 8, a block diagram illustrates an illustrative hardware implementation of a computer system in accordance with which one or more components/steps of a similarity measurement system (e.g., components/steps described in the context of FIGS. 1 through 7) may be implemented, according to an embodiment of the present invention. That is, by way of example, system 600 in FIG. 6A and/or system 610 in FIG. 6B may be implemented in this manner.

Further, it is to be understood that the individual components/steps may be implemented on one such computer system, or more preferably, on more than one such computer system. In the case of an implementation on a distributed system, the individual computer systems and/or devices may be connected via a suitable network, e.g., the Internet or World Wide Web. However, the system may be realized via private or local networks. The invention is not limited to any particular network.

As shown, the computer system 800 may be implemented in accordance with a processor 802, a memory 804, I/O devices 806, and a network interface 808, coupled via a computer bus 810 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

We now present an evaluation of the time complexity of the inventive algorithm. We also describe some of the results of applying this similarity metric on a sample ontology.

The complexity of our algorithm for computing the similarity between two individuals depends on the number of individuals ($|I|$), classes ($|C|$), properties ($|P|$) and statements ($|S|$) of property values and class membership in the ontology. Creating virtual individual classes for the two individuals under consideration takes constant time. Finding the set of least common ancestors takes $O(|C|)$ time. Finding their members is $O(|S|)$. Computing the intersection costs $O(|I|^2)$ steps. If we consider the combined similarity based on all properties, this process must, potentially, be repeated twice for each property (to consider both object-set and subject-set similarity). Computing the log values for the description and the commonality, as well as dividing the results are neglected. Hence, the worst case complexity is therefore $O(|P|) \cdot (|C| + |S| + |I|^2))$.

The main element of the complexity comes from the computation of the intersection, where lookup of a single element could take linear time. Using a bash set to represent the individuals in a concepts reduces the amortized lookup time to $O(1)$. Therefore, real life (amortized) complexity is $O(|P|) \cdot (|C| + |S| + |I|))$. Note that in a complete implementation, there is great scope for optimization since induced taxonomies produced when calculating similarity for one pair of individuals can be reused for another pair.

While there are a number of publicly available ontologies, only a few of them have both a taxonomy and a rich set of relationships between individuals, on which we can apply our algorithm. For purposes of evaluation, we chose the wine ontology [W3C, "The wine ontology," In http://www.w3.org/TR/2004/REC-owl-guide-0040210/wine.rdf], which has both these features. In addition, since the wine ontology describes well known entities (like wines, colors and locations), it is possible to gain an intuition for the results returned by the similarity metric.

In the following tables, we show the similarity measure, $f$, for a few pairs of individuals from the wine ontology. The first data row in every table gives the similarity between the individuals based on a single aspect only. The aspects are concept-set similarity and object-set similarity of different properties. The second row gives the combined measure for a certain aspect and all the aspects to its left. The number of individuals in the lca-intersection of an aspect (or for a combination of aspects) is given in brackets.

The individuals StonleighSauvignonBlanc and SelaksIceWine have the following measures:

| Aspect | Concept | hasColor | hasDescriptor | locatedIn |
| --- | --- | --- | --- | --- |
| Single | 0.395 (25) | 0.395 (25) | 0.505 (14) | 0.635 (7) |
| Combined | 0.395 (25) | 0.505 (14) | 0.505 (14) | 0.698 (5) |

The lca-intersection of concept-similarity has 25 individuals, and similarity is 0.395. The object-set similarity of hasColor is also 0.395. Combining the two, the lca-intersection has 14 individuals, and the combined measure is 0.505. This is an example of how the combined similarity increases as more aspects are considered.

The locatedIn property contributes a significant amount of information content, having only 7 individuals in the lca-intersection. That is, very few wines share the same location (or the same class of location) as these two wines. This is an example of the inverse dependence of our metric on subject-set cardinality. A similarity measure that does not take the locatedIn property into consideration misses the significance of the relatively rare value for this property. Combining the different aspects gives a total similarity of 0.698, while considering taxonomy only gives 0.395.

The individuals ChateauMorgon and LaneTannerPinotNoir have the following measures:

| Aspect | Concept | hasColor | hasDescriptor | locatedIn |
| --- | --- | --- | --- | --- |
| Single | 0.395 (25) | 0.388 (26) | 0.869 (2) | 0.179 (79) |
| Combined | 0.395 (25) | 0.395 (25) | 0.869 (2) | 0.869 (2) |

The individuals StonleighSauvignonBlanc and CongressSemillon have the following measures:

| Aspect | Concept | hasColor | hasDescriptor | madeFromGrape |
| --- | --- | --- | --- | --- |
| single | 0.663 (6) | 0.395 (25) | 0.587 (9) | 0.281 (46) |
| Combined | 0.663 (6) | 0.663 (6) | 0.739 (4) | 0.739 (4) |

The two tables above show that even though adding aspects increases the absolute values of similarity, the relative similarity between two pairs of individuals may change as more information is considered. In one case, adding aspects increased similarity from 0.395 to 0.869. In the other case, similarity increased from 0.663 to 0.739.

The individuals ChateauChevalBlancStEmilion and WhitehallLanePrimavera have the following measures:

| Aspect | Concept | hasColor | hasDescriptor | locatedIn |
|---|---|---|---|---|
| Single | 0.255 (53) | 0 (206) | 0.255 (53) | 0.179 (79) |
| Combined | 0.255 (53) | 0.255 (53) | 0.255 (53) | 0.265 (50) |

Concept-set similarity is 0.255 since there are relatively many individuals in the corresponding lca-intersection (inverse dependence on concept-set cardinality). In this example, there is no similarity for the aspect hasColor, since WhitehallLanePrimavera does not have a color (minimum similarity under disjointness). The lca-intersection of hasDescriptor has the exact same set as the lca-intersection associated with concept similarity. Thus, the combined similarity of the three aspects remains 0.255. The lca-intersection of locatedIn has 79 individuals, but intersecting it with the other lca-intersections gives 50 individuals. The combined similarity is 0.265.

Our results show that there are a number of cases where considering the relationships between individuals, based on different properties, is very useful while calculating the similarity between the individuals. Our proposed similarity metric is able to capture a number of useful features about the different aspects, and give a combined value of similarity for the different aspects.

Advantageously, as described above, based on an information-theoretic definition of similarity between classes in a taxonomy, we developed a method to measure the similarity between individuals. Description and commonality are computed using an extended taxonomy which includes virtual classes, and which is obtained by reorganizing domain individuals of a property according to the range's sub-taxonomy and vice versa. We also proved that our metric satisfies a number of useful properties of similarity between individuals. We considered object properties, though our algorithm can be extended to data type properties using an appropriate definition of similarity between literals.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of measuring similarity between instances in an ontology for use in an information retrieval system, the method comprising the steps of:
obtaining a set of instances from the ontology;
computing a first similarity metric that measures similarity between instances in the set of instances with respect to ontology concepts to which the instances belong; and
storing at least one taxonomy induced by the first similarity metric, wherein the at least one induced taxonomy is usable for responding to requests submitted to the information retrieval system;
wherein the first similarity metric measures similarity of instances i and j in the set of instances based on the similarity of C(i) and C(j), where the C(i) and the C(j) represent sets of concepts to which the instances belong; and
wherein the first similarity metric considers concept membership statements of the instances in the set of instances by defining a description of an individual and a commonality between the instances based on the ontology concepts to which the instances belong;
and further wherein the obtaining, computing and storing steps are performed by a processor and memory.

2. The method of claim 1 further comprising the steps of:
computing at least one of the following additional similarity metrics for the set of instances:
a second similarity metric which measures similarity between second instances in the set of instances, wherein the second instances are subjects in first statements involving at least one given first ontology property; and
a third similarity metric which measures similarity between third instances in the set of instances, wherein the third instances are objects in second statements involving at least one given second ontology property;
wherein two or more induced taxonomies corresponding to at least two of the first similarity metric, the second similarity metric and the third similarity metric are stored; and
merging the two or more induced taxonomies to form a combined taxonomy, wherein the combined taxonomy is usable for responding to requests submitted to the information retrieval system.

3. The method of claim 1, wherein a description of an instance is computed by defining a virtual class and making the instance the only member of the virtual class.

4. The method of claim 3, wherein information content of the description of the instance is a probability that a random instance belongs to the virtual class.

5. The method of claim 4, wherein the commonality between the instances i and j is computed by expanding respective descriptions to include one or more other concept membership statements that can be inferred based on a concept taxonomy such that information content in the commonality is a probability that a pair of random instances satisfies the pair of class membership statements in the commonality.

6. The method of claim 5, wherein $C(i,j)$ denotes the set of classes that are a least common ancestors of a virtual class for i and a virtual class for j, and $V_{i,j}$ denotes the intersection of all classes in the $C(i,j)$ and represents a least common ancestors intersection class for the instances i and j, and information content in the commonality between the instances i and j is a probability that a pair of random instances belong to $V_{i,j}$.

7. The method of claim 2, wherein the two or more induced taxonomies are merged by merging two or more virtual classes for each instance computed in accordance with two or more of the first, second and third similarity metrics.

8. A method of measuring similarity between instances in an ontology for use in an information retrieval system, the method comprising the steps of:
obtaining a set of instances from the ontology;
computing at least one of the following similarity metrics for the set of instances:
a first metric that measures similarity between instances in the set of instances with respect to ontology concepts to which the instances belong;
a second metric which measures similarity between instances in the set of instances where the instances are subjects in statements involving a given ontology property; and
a third metric which measures similarity between instances in the set of instances where the instances are objects in statements involving a given ontology property; and
storing at least one taxonomy induced by the at least one computed similarity metric, wherein the at least one induced taxonomy is usable for responding to requests submitted to an information retrieval system;

wherein the first metric, the second metric and the third metric comprise information theory-based measurements.

9. A method of measuring similarity between instances in an ontology for use in an information retrieval system, the method comprising the steps of:

obtaining a set of instances from the ontology;

computing a similarity metric which measures similarity between instances in the set of instances where the instances are subjects in statements involving at least one given ontology property; and storing at least one taxonomy induced by the similarity metric, wherein the at least one induced taxonomy is usable for responding to requests submitted to the information retrieval system;

wherein the similarity metric measures similarity of instances i and j in the set of instances based on the similarity of sets of objects in statements where the instances are subjects in the statements;

and further wherein the obtaining, computing and storing steps are performed by a processor and memory.

10. The method of claim 9, wherein the similarity between the instances i and j is based on statements where the instances i and j are the subjects and a predicate is the at least one given ontology property.

11. The method of claim 10, wherein an instance is considered to belong to a virtual class of size one and a description for the instance is defined in terms of membership of the instance to the virtual class of size one.

12. The method of claim 11, wherein the virtual class is associated with a taxonomy defined based on a range of the at least one given ontology property.

13. The method of claim 12, wherein information content of the description of the instance is a probability that a random individual belongs to the virtual class.

14. The method of claim 13, wherein a commonality between the instances i and j is computed by expanding respective descriptions to include one or more other statements that can be inferred based on the object-sets for the at least one given ontology property and the taxonomy defined based on the range of the at least one given ontology property, and obtaining common pairs of statements that occur in both of the respective descriptions.

15. The method of claim 14, wherein information content in the commonality is a probability that a pair of random instances satisfies a pair of statements in the commonality.

16. A method of measuring similarity between instances in an ontology for use in an information retrieval system, the method comprising the steps of:

obtaining a set of instances from the ontology;

computing a similarity metric which measures similarity between instances in the set of instances where the instances are objects in statements involving at least one given ontology property; and storing at least one taxonomy induced by the similarity metric, wherein the at least one induced taxonomy is usable for responding to requests submitted to the information retrieval system;

wherein the similarity metric measures similarity of instances i and j in the set of instances based on the similarity of sets of subjects in statements where the instances are objects in the statements;

and further wherein the obtaining, computing and storing steps are performed by a processor and memory.

17. The method of claim 16, wherein the similarity between the instances i and j is based on statements where the instances i and j are the objects in the statements and a predicate is the at least one given ontology property.

18. The method of claim 17, wherein an instance is considered to belong to a virtual class of size one and a description for the instance is defined in terms of membership of the instance to the virtual class of size one.

19. The method of claim 18, wherein the virtual class is associated with a taxonomy defined based on the domain of the at least one given ontology property.

20. The method of claim 19, wherein information content of the description of the instance is a probability that a random individual belongs to the virtual class.

21. The method of claim 20, wherein a commonality between the instances i and j is computed by expanding respective descriptions to include one or more other statements that can be inferred based on the subject-sets for the at least one given ontology property and the taxonomy defined based on the domain of the at least one given ontology property, and obtaining common pairs of statements that occur in both of the respective descriptions.

22. The method of claim 21, wherein information content in the commonality is a probability that a pair of random instances satisfies a pairs of statements in the commonality.

23. An article of manufacture for measuring similarity between instances in an ontology for use in an information retrieval system, comprising a computer readable storage medium containing one or more programs which when executed by a processor implement the steps of:

obtaining a set of instances from the ontology;

computing at least one of the following similarity metrics for the set of instances:

a first similarity metric that measures similarity between first instances in the set of instances with respect to ontology concepts to which the first instances belong, wherein the first similarity metric measures similarity of first instances i1 and j1 in the set of instances based on the similarity of C(i1) and C(j1), wherein the C(i1) and the C(j1) represent sets of concepts to which the first instances belong, and wherein the first similarity metric considers concept membership statements of the first instances in the set of instances by defining a description of an individual and a commonality between the first instances based on the ontology concepts to which the first instances belong;

a second similarity metric which measures similarity between second instances in the set of instances, wherein the second instances are subjects in first statements involving at least one given first ontology property, wherein the second similarity metric measures similarity of second instances i2 and j2 in the set of instances based on similarity of sets of objects in the first statements where the second instances are the subjects in the first statements; and a third similarity metric which measures similarity between third instances in the set of instances, wherein the third instances are objects in second statements involving at least one given second ontology property, wherein the third similarity metric measures similarity of third instances i3 and j3 in the set of instances based on similarity of sets of subjects in the second statements where the third instances are objects in the second statements; and storing at least one taxonomy induced by at least one of the first, the second and the third similarity metric, wherein the at least one induced taxonomy is usable for responding to requests submitted to the information retrieval system.

24. Apparatus for measuring similarity between instances in an ontology for use in an information retrieval system, the apparatus comprising:

a memory; and a processor coupled to the memory and operative to:

(i) obtain a set of instances from the ontology;

(ii) compute at least one of the following similarity metrics for the set of instances:

a first similarity metric that measures similarity between first instances in the set of instances with respect to ontology concepts to which the first instances belong, wherein the first similarity metric measures similarity of first instances i1 and j1 in the set of instances based on the similarity of C(i1) and C(j1), wherein the C(i1) and the C(j1) represent sets of concepts to which the first instances belong, and wherein the first similarity metric considers concept membership statements of the first instances in the set of instances by defining a description of an individual and a commonality between the first instances based on the ontology concepts to which the first instances belong;

a second similarity metric which measures similarity between second instances in the set of instances where the second instances are subjects in first statements involving at least one given first ontology property, wherein the second similarity metric measures similarity of second instances i2 and j2 in the set of instances based on similarity of sets of objects in the first statements where the second instances are the subjects in the first statements; and a third similarity metric which measures similarity between third instances in the set of instances where the third instances are objects in second statements involving at least one given second ontology property, wherein the third similarity metric measures similarity of third instances i3 and j3 in the set of instances based on similarity of sets of subjects in the second statements where the third instances are objects in the second statements; and (iii) store at least one taxonomy induced by at least one of the first, the second and the third similarity metrics, wherein the at least one induced taxonomy is usable for responding to requests submitted to an information retrieval system.

25. An information retrieval system, comprising a similarity measurement system comprising a memory and a processor coupled to the memory, the information retrieval system configured to:

(i) obtain a set of instances from the ontology;

(ii) compute at least one of the following similarity metrics for the set of instances:

a first similarity metric that measures similarity between first instances in the set of instances with respect to ontology concepts to which the first instances belong, wherein the first similarity metric measures similarity of first instances i1 and j1 in the set of instances based on the similarity of C(i1) and C(j1), wherein the C(i1) and the C(j1) represent sets of concepts to which the first instances belong, and wherein the first similarity metric considers concept membership statements of the first instances in the set of instances by defining a description of an individual and a commonality between the first instances based on the ontology concepts to which the first instances belong;

a second similarity metric which measures similarity between second instances in the set of instances where the second instances are subjects in first statements involving at least one given first ontology property, wherein the second similarity metric measures similarity of second instances i2 and j2 in the set of instances based on similarity of sets of objects in the first statements where the second instances are the subjects in the first statements; and a third similarity metric which measures similarity between third instances in the set of instances where the third instances are objects in second statements involving at least one given second ontology property, wherein the third similarity metric measures similarity of third instances i3 and j3 in the set of instances based on similarity of sets of subjects in the second statements where the third instances are objects in the second statements; and (iii) store at least one taxonomy induced by at least one of the first, the second and the third similarity metrics, wherein the at least one induced taxonomy is usable for responding to requests submitted to an information retrieval system.

* * * * *